United States Patent
Tirpak et al.

(10) Patent No.: US 8,050,191 B2
(45) Date of Patent: Nov. 1, 2011

(54) DISTRIBUTED INFORMATION STORAGE AND RETRIEVAL OF COMMUNICATION NETWORK PERFORMANCE DATA

(75) Inventors: Thomas M. Tirpak, Glenview, IL (US); Craig A. Ibbotson, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 319 days.

(21) Appl. No.: 12/471,574

(22) Filed: May 26, 2009

(65) Prior Publication Data

US 2010/0302954 A1   Dec. 2, 2010

(51) Int. Cl.
*H04L 1/00* (2006.01)

(52) U.S. Cl. .................. 370/252; 370/428

(58) Field of Classification Search .......... None
See application file for complete search history.

(56) References Cited

U.S. PATENT DOCUMENTS

| | | | |
|---|---|---|---|
| 6,442,547 B1 | 8/2002 | Bowman-Amuah | |
| 7,310,625 B2 | 12/2007 | Wu | |
| 7,929,457 B2 * | 4/2011 | Healy et al. | 370/252 |
| 2004/0203646 A1 | 10/2004 | Rudd et al. | |
| 2004/0266442 A1 * | 12/2004 | Flanagan et al. | 455/445 |
| 2005/0097209 A1 * | 5/2005 | McDonagh et al. | 709/224 |
| 2007/0061487 A1 | 3/2007 | Moore et al. | |
| 2008/0032677 A1 * | 2/2008 | Catovic et al. | 455/414.1 |
| 2009/0227251 A1 * | 9/2009 | Lei et al. | 455/425 |
| 2010/0088410 A1 * | 4/2010 | Ridley | 709/224 |
| 2010/0123575 A1 * | 5/2010 | Mittal et al. | 340/540 |
| 2010/0203881 A1 * | 8/2010 | del Rio Romero et al. | 455/423 |
| 2010/0296474 A1 * | 11/2010 | Noriega | 370/329 |
| 2010/0302954 A1 * | 12/2010 | Tirpak et al. | 370/252 |
| 2011/0125509 A1 * | 5/2011 | Lidstrom et al. | 705/1.1 |

FOREIGN PATENT DOCUMENTS

| | | |
|---|---|---|
| WO | 2008057649 A1 | 5/2008 |
| WO | 2009029289 A1 | 3/2009 |

OTHER PUBLICATIONS

Patent Cooperation Treaty, International Search Report and Written Opinion of the International Searching Authority for International Application No. PCT/US2010/033814, Dec. 22, 2010, 9 pages.

Becerra-Fernandez, Irma: "Searching for Experts on the Web: A Review of Contemporary Expertise Locator Systems", ACM Transactions on Internet Technology, vol. 6, No. 4, Nov. 2006, all pages.

Lorenzi, Fabiana: "A Multiagent Knowledge-Based Recommender Approach With Truth Maintenance", RecSys '07, Oct. 19-20, 2007, Minneapolis, Minnesota, USA, 2007, pp. 195-198.

(Continued)

*Primary Examiner* — Hassan Kizou
*Assistant Examiner* — Roberta A Shand

(57) ABSTRACT

An apparatus and method for information storage and retrieval of communication network performance data includes a first step 200 of obtaining performance data from network entities. A next step 202 includes generating a rating for the performance data relating to how interesting that data is to network entities. A next step 204 includes archiving a portion of the performance data in response to the rating of the performance data.

16 Claims, 2 Drawing Sheets

OTHER PUBLICATIONS

Diggelen, Jurriaan van et al.: "Agent Communication in Ubiquitous Computing: the Ubismart Approach", Proc. of 7th Int. Conf. on Autonomous Agents and Multiagent Systems (AAMAS 2008), Padgham, Parkes, Muller and Parsons (eds.), May 12-16, 2008, Estoril, Portugal, pp. 813-820.

Uy, Bin et al.: "An Agent-Based Approach to Knowledge Management", CIKM'02, Nov. 4-9, 2002, McLean, Virginia, Copyright 2002, ACM 1-58113-492-4/02/0011, pp. 642-644.

Multanen, Mikko et al.: "Hierarchical analysis of GSM network performance data", ESANN'2006 proceedings_European Symposium on Artificial Neural Networks Bruges (Belgium), Apr. 26-28, 2006, d-side publi., ISBN 2-930307-06-4, pp. 449-454.

Hulten, Par et al.: The calculation of KPIs (Key Performance Indicators) is a method to access end-user perception of a service, for example web surfing, "Understanding KPIs", TEMS News,(Telefonaktiebolaget LM Ericsson), No. 3, 2005, pp. 1-2.

* cited by examiner

DISTRIBUTED INFORMATION STORAGE AND RETRIEVAL OF COMMUNICATION NETWORK PERFORMANCE DATA

FIELD OF THE INVENTION

The present invention relates generally to communication networks and, in particular, to information storage and retrieval of data in a communication network.

BACKGROUND OF THE INVENTION

In Universal Mobile Telecommunications System (UMTS) wireless communication networks, and Long Term Evolution (LTE) and 4G wireless telecommunication networks that include an Evolved UMTS Terrestrial Radio Access Network (E-UTRAN), communication network operational performance data are utilized for analyzing network performance, troubleshooting warnings and error conditions, optimizing network operation, planning and configuring network topology, and other diagnostic functions.

Specifically, Key Performance Indicators (KPIs), such as mean data in kilobits per second are used to monitor and manage the operation of cellular communication networks. Measurements are made, and metrics are calculated, by many entities in a network, e.g., cell sites, access points, and end-user devices. Thus, there is the opportunity for obtaining in-depth measurements to guide network management. However, all these performance data from all these network entities has the potential problem of overloading the available data storage or processing capabilities of the nodes, or communication resources of the network. The problem is even greater in Self-Organizing Networks, where the nodes (a) share data to support collaborative network management, and (b) there is limited bandwidth for inter-node communication.

One solution to the problem provides a global view by clustering the available data in multiple network elements, thereby making queries of existing data more efficient. However, this solution does not provide a mechanism to help individual network elements maximize their efficiency with the data that they collect, store, and communicate in a peer-to-peer manner.

Another solution presents a distributed multi-agent recommender system in which agents collaborate to provide recommendations and to decide whether to increase or decrease their own expertise in a given topic area. However, this solution does not indicate how this peer-to-peer collaboration might be supplemented with centralized nomination of agents to become experts. Likewise, it does not address the bandwidth or storage resource constraints of a typical telecommunication network.

Accordingly, there is a need for cost effective technique to provide distributed KPI data bases. It would also be of benefit if this technique could overcome the problems of overloading the available data storage, processing capabilities of the nodes, and communication resources of the network.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings in which:

Figure 1:
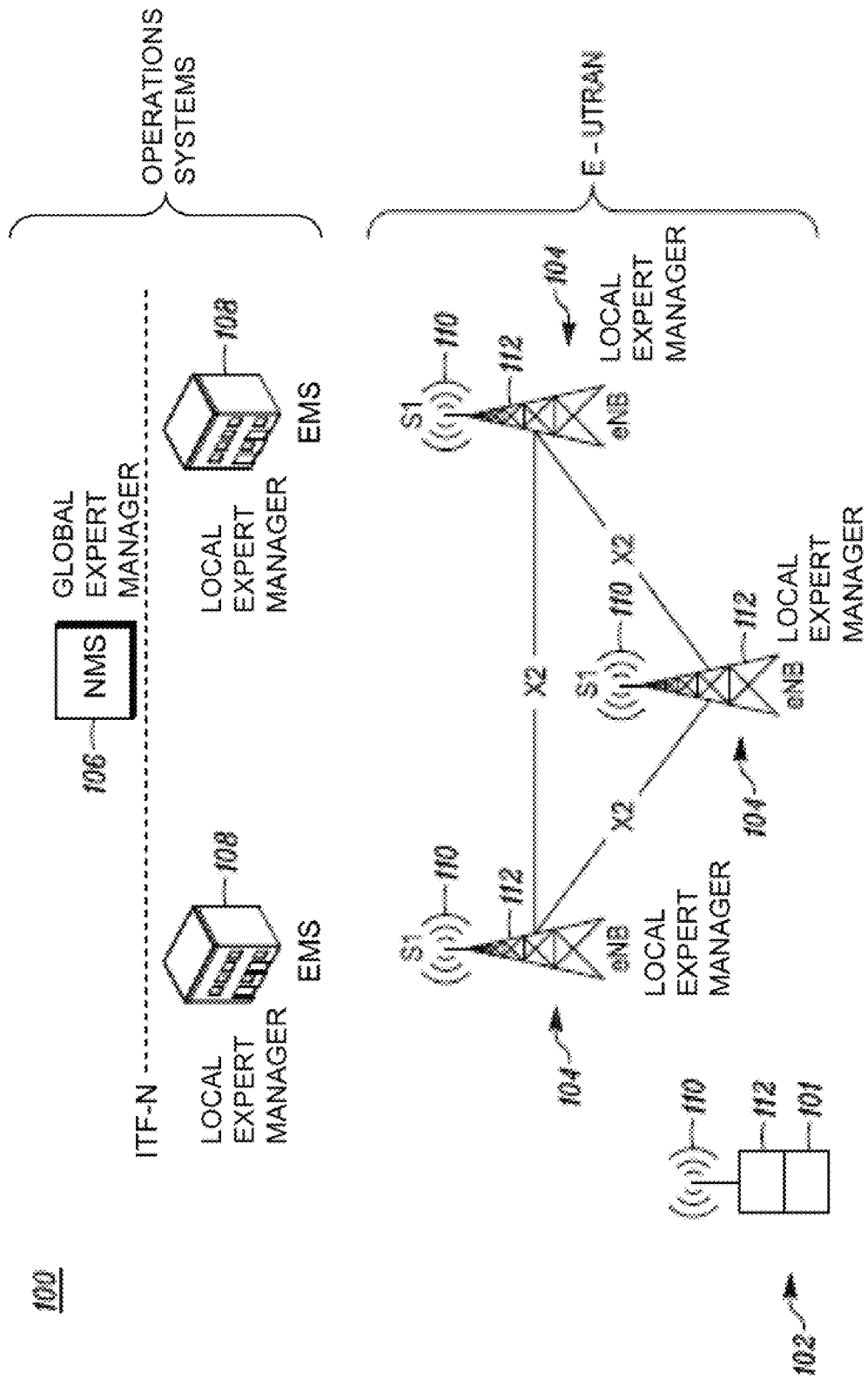
FIG. 1 is an example of wireless communication network elements used in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF EMBODIMENTS OF THE INVENTION

The present invention provides a cost-effective technique to provide distributed KPI data bases. It would also be of benefit if this technique could overcome the problems of overloading the available data storage, processing capabilities of the nodes, and communication resources of the network. In particular, the present invention provides telecommunication network management system with distributed collection, processing, and storage of system performance metrics, dynamically designating a node (or network entity, or agent) as an expert for a class of metrics, thereby simultaneously optimizing the network resource utilization and the quality of performance metric reports (available to both centralized and distributed management entities).

Specifically, the present invention provides a technique for gathering metrics for network management and optimization purposes, by means of multiple software agents or Local Expert Managers (LEMs) operative within Base Transceiver Stations of a cellular telecommunication network and located on various nodes distributed throughout the network, which gather, process, and store various performance metrics that can have value for informing or guiding the operation of network entities. Each agent has the ability to be designated an "expert", or preferred source, for a particular class of data or metrics. A value for the level of expertise is calculated for each agent, for each class of metrics, based upon three factors: the degree to which other agents consider an agent to be an expert, the degree to which a central Global Expert Manager (GEM) considers an agent to be an expert, and the uniqueness of data in the agent's database. Agents, and the GEM, monitor the metrics broadcast by other agents to see which agents provide the most accurate performance data or metrics for different metric classes. Each agent can also broadcast its level of expertise, so other agents know whether to query it for metrics. The GEM also can monitor these queries, to better establish which agents are experts. The GEM also coordinates and optimizes this network of expert agents, including making sure there are optimum numbers of experts for each metric class.

An agent's location in the network, connectivity to other agents, local data storage, local processor power, transcoders, Data Type Dictionaries, specialized computing hardware, etc., would definitely affect the establishment of a node's status as an "expert". Most likely, these parameters would also affect their availability, as viewed by other nodes in the network. In one implementation, an agent would be designated a priori as an "expert" because of its proximity to a specific data source, e.g., a cell site in a particular city would be the expert on Key Performance Indicators for the Tracking Area including that city. In yet another implementation, agents would be deployed with rule sets to self-nominate themselves as an "expert", e.g., "If you are directly connected to node 358 and have a STAT2 Data Compression Engine, then you should be an expert in metric M789." This would augment the peer-to-peer dynamic process of identifying experts.

Before describing the detailed embodiments that are in accordance with the present invention, it should be observed that the embodiments reside primarily in combinations of method steps and apparatus components related to a wireless communication network such as E-UTRAN in LTE, which includes evolved NodeBs (eNB). Accordingly, the apparatus, components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of a trace session in LTE described herein. The non-processor circuits may include, but are not limited to, a radio receiver, a radio transmitter, signal drivers, clock circuits, power source circuits, and user input devices. As such, these functions may be interpreted as steps of a method to perform the trace session in LTE. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Turning to FIG. 1, a wireless communication network 100 is shown that includes the network elements used in connection with the embodiments described herein. The network 100 shown is described as an LTE-type network and includes an E-UTRAN network although it is understood that the principles and embodiments described can be applied to other types of communication networks. Network 100 is used by a subscriber whose identifier is residing in user equipment 102, which can be any type of mobile station. User equipment 102 access the E-UTRAN network to communicate with other user equipment and other network entities through an eNodeB 104 node. The eNodeB 104 nodes function as an access point into the wireless communication network and as a base station to communicate with other network entities or nodes within the network 100. As is understood, the E-UTRAN consists of eNodeBs 104 that are interconnected with each other by given X2 interfaces. The eNodeBs 104 host functions including radio resource management, network measurements, radio bearer control, radio admission control, connection mobility and dynamic allocation of resources for use by a subscriber via user equipment 102.

The network 100 can also include a network management service 106 (NMS). The NMS 106 specifies a package of management functions for network elements such as eNodeB 104. The NMS can be associated with eNodeB 104 or any combination of other network elements and can provide element management functions and sub-network management functions for the network elements. In addition, the network 100 can include an Enhanced Messaging Service 108 (EMS), which can communicate with the NMS over a North Bound interface. The EMS can provide scheduling and transmission of paging messages and broadcast messages that are provided to the eNodeBs 104 or other network elements.

As is understood by one of ordinary skill in the art, the user equipment 102 and the eNodeBs 104 include a standard transceiver 110 and processor 112 with a memory 101. The transceiver transmits and receives messages and requests sent between the user equipment 102 and the eNodeBs over an S1 interface. The user equipment 102 and eNodeBs 104 including their respective transceivers 110 are operated using the processor 112.

Figure 2:
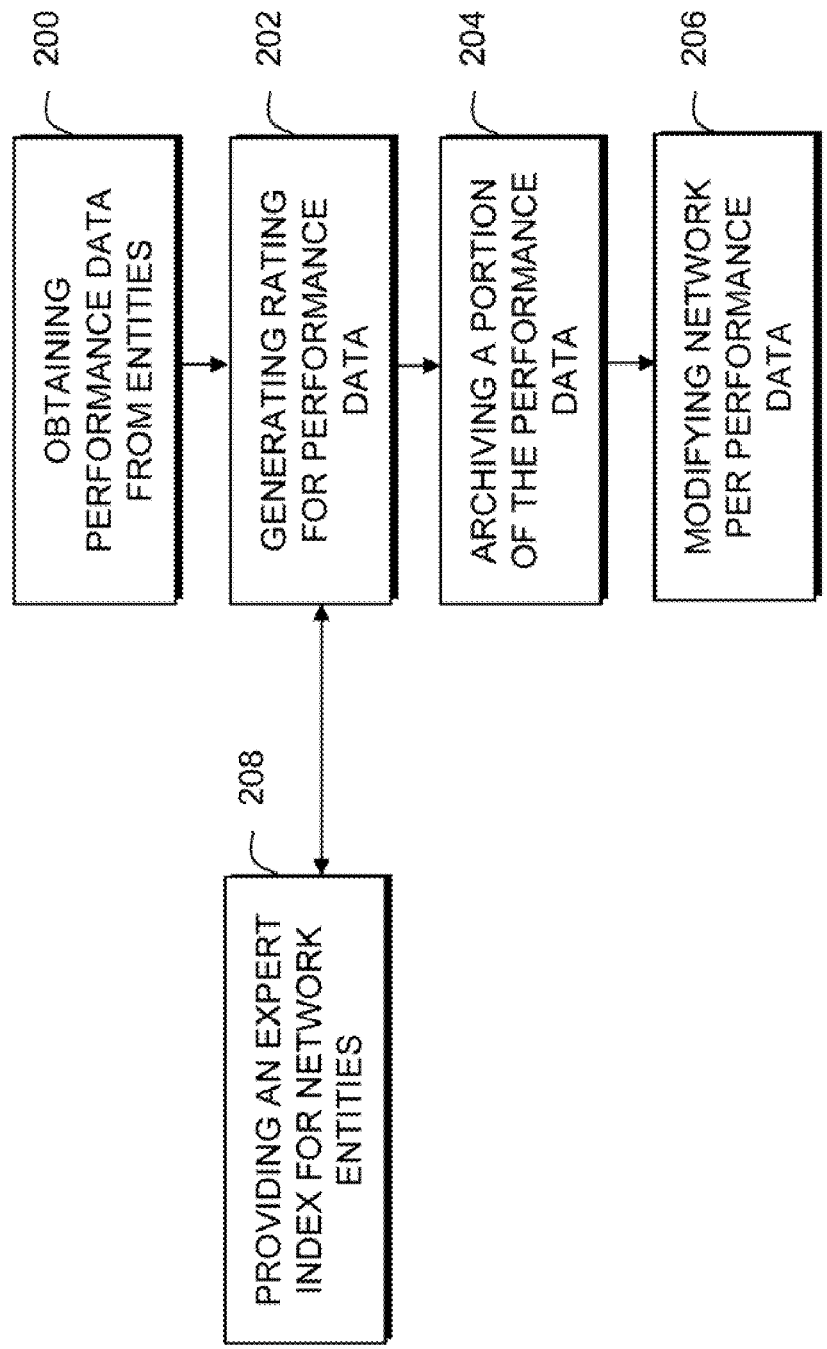
FIG. 2 illustrates a method, in accordance with the present invention.

FIG. 2 illustrates a method for archiving communication network performance data that includes a first step 200 of a receiver of a Local Expert Manager (LEM) obtaining performance data from network entities, such as other eNBs. The LEM is a software agent that runs in parallel with local data collection and monitoring mechanisms at the eNB site. The LEM monitors and manages a local database of raw performance data and calculated performance metrics calculated from the raw performance data, hereinafter collectively referred to as "performance data". The performance data can be obtained passively by mentoring broadcasts of performance data from other network entities, or can be obtained actively by querying other network entities for their performance data, which can include only such performance data for which a network entity is considered an expert.

For example, The LEM at an eNB site M can listen to the metrics broadcast by other sites on the S1 interface. If within a pre-specified time, site N reports metric y with accuracy z a pre-specified number of times, then the LEM increases the expert score for site N for metric y by a certain amount in its local expert index (LEI) database. (If site N is not currently listed in site M's LEI, then it is added with a default expert score.) Conversely, if for a certain amount of time, site N broadcasts no further updates to metric y, then the LEM at site M may decrease its expert score. As processor power and peer-to-peer communication bandwidth permit, e.g., via LTE X2 interface, the LEM at site M may query site N for a list of the performance data items and metrics for which site N considers itself to be an expert. Similarly, the LEM may periodically receive and respond to queries from other sites or network management entities for the most current performance data item x or metric y.

Table 1 shows the particular relationships between network entities and how performance data can be obtained or exchanged. It should be noted that performance data and/or metrics is already being broadcast/shared by nodes in a telecommunication network, and that the present invention "listens in" to such broadcasts to capture this information and create expert knowledge bases. Above and beyond what is already being communicated in a telecommunication network using generic message types that currently exist in the 3GPP and X2AP communication standards, the present invention proposes the GEM and LEM exchange the several kinds of this information utilizing different Message Type as shown.

TABLE 1

Performance data exchange

| Message Type | Sender | Receiver | Size | Frequency |
| --- | --- | --- | --- | --- |
| Request list of data for which LEM2 considers itself to be an expert. | LEM1 | LEM2 | <32 bytes. | Once for each neighbor cell; hourly for a new cell deployment, nightly for an existing network. |
| List of data for which LEM2 considers itself to be an expert. | LEM2 | LEM1 | About 256 bytes per metric[1]; maximum of 7.5 kb per message[2]. | Once for each neighbor cell; hourly for a new cell deployment, nightly for an existing network. |
| Request for data. | Any entity | LEM | <288 bytes, including metadata describing the desired data. | As needed for generating network status reports and executing Self-Organizing Network Policies; about 1,000 times a day for NMS, and 100 for Base Station. |
| Data value. | LEM | Any entity | <288 bytes, including the LEM's full set of metadata describing the metric. | As needed for generating network status reports and executing Self-Organizing Network Policies. |
| Broadcast LEM's self-nominated expert status for given data. | LEM | Any entity | About 256 bytes. | A few times a day. |
| GEM notifies LEM of its expert status for certain data. | GEM | LEM | About 260 bytes per data, including GEM's expert score; maximum of 8 kb per message. | Once a day, during a period of low network utilization; GEM do this more frequently, as a result of identifying a special condition, e.g., high load due to traffic accident. |
| GEM informs LEM how to calculate Interestingness Scores. | GEM | LEM | About 32 bytes. | Once a day, during a period of low network utilization; more frequently when special conditions exist. |

[1]256 bytes approximates Google's current search limits of 32 keywords. It has been shown that humans performing Information Retrieval tasks are generally the most effective with about 7 keywords. The 256 byte limit is assumed to provide enough specificity in the metadata describing any metric within a practicable body of knowledge.
[2]Periodically, an LEM applies a Clustering Algorithm to the metadata describing a list of metrics for which it considers itself to be an expert. In this way, it is possible to identify super-categories of expertise, e.g., "Schaumburg" is a category of metric encompassing "1301 E. Algonquin, Schaumburg" and "1303 E. Algonquin, Schaumburg". By specifying a maximum number of clusters, it is possible to limit the size of the list of metrics. Text Mining is most effective with about 30 topic clusters.

The amount of additional traffic resulting from the above messaging is not large compared to existing communication and control messages. In addition, most of the LEM and GEM messages can be set asynchronously, with low priority, during periods of low network utilization. This step can also include the GEM monitoring network resource utilization. The LEM can also aware of resource utilization, and adapts the priority of data exchanges (as listed in Table 1) based on its own view of the benefit of communicating data supporting an "Archive Action" versus the benefit of communicating for other purposes (1) carrying data/voice calls for paying customers and/or (2) executing other network management/control functions. In this way the present invention is an intelligent, friendly overlay on existing network management/control functions.

A next step 202 includes a processor of the LEM generating a rating for the obtained performance data relating to how interesting or important that data is to the network entity at which the data currently resides, or to other network entities, such that these network entities can change their operations, and therefore the network operations, based on the performance data. The rating is based on a combination of a global rating, a peer rating, and a uniqueness rating of the performance data. In particular, the LEM implements an Interestingness Score (IS) function that can be applied to the performance data contents of its local database, as follows: $IS(x)=f(c_1Q(x),c_2R(x),c_3S(x))$, where x is the performance data to be scored, $c_i$ are relative importance coefficients, Q is the global rating, R is the peer rating, and S is the uniqueness rating.

For example: Q(x) generates a score on a zero to one range indicating the degree to which the LEM is recognized (by a Global Expert Manager (GEM) that is a software agent that runs within a centralized network management entity, or other network entities or LEMs) as an expert for performance data item x or metric y, e.g., "dropped call rate for Priority Class 1 users for May 2009". R(x) generates a score on a zero to one range indicating the degree to which the LEM is recognized by its peers, i.e., the LEMs at other sites, as an expert for performance data item x or metric y. S(x) generates a score on a zero to one range indicating the unique information content of the performance data item x or metric y, with respect to other data in the local database, i.e., whether it a statistically different outlier or "special case", as determined by applying one of the Data Mining methods known in the art. The functions Q, R, and S, may be implemented as a logic tree or Rule Based System (RBS). The set of coefficients ($c_i$) within the IS function designate the relative importance of Q, R, and S. Where the GEM has been monitoring network resource utilization (in the previous step), this step can include the GEM communicating to a local expert manager an updated set of coefficients for calculating an interestingness score, when the monitored resource utilization is sufficiently low, or sufficiently important given the GEM's assessment of the impact of communicating such an update.

An optional step 208 can provide an expert index that identifies network entities having an expert score for particular performance data. The expert index can be generated in each LEM for itself and other network entities, or it can be centrally generated as a Global Expert Index in a GEM. For example, the LEM for site M can periodically receive from the GEM a list of performance data, for which the GEM considers the LEM of site M to be an expert. In practice, the expert score is derived for a network entity by a number of times a performance data is provided by that network entity and an accuracy of the performance data provided by that network entity. Preferably, the accuracy is determined by the site that reports the data, and depends on the available data sources and measurement equipment. The accuracy characterization also considers statistical norms, such as standard deviation and confidence level. In one implementation, the accuracy would be reported as the variance (which equals standard deviation/mean). In another implementation, the accuracy would be incorporated within data reports of in a particular format, such as {Lower Limit, Confidence Value, Upper Limit, Confidence Value}. For example, the Fahrenheit temperature in a particular city on Jan. 1, 2009 is {17.0, 5%, 28.0, 95%}. Alternatively, the expert score can be derived for a network entity by a number of times that the network entity is queried for the performance data. If multiple network entities are indexed as experts for the same performance data, then the network entity with the lowest expert score for that performance data can be delisted as an expert for that performance data. This makes network archiving less redundant and more efficient.

In the case of a Global Expert Index, network entities can recommend themselves for a global expert index as experts for particular performance data, and are accepted into the global expert index depending on their expert scores. The GEM maintains the Global Expert Index, i.e., a database of metrics and the respective sites where these metrics may be obtained. For each entry in the Global Expert Index there is an expert score. The GEM can periodically update the expert scores associated with sites for specific metrics using parameters such as an Availability of a Metric, a Reputation of an entity, or a network Efficiency.

For the Availability of a Metric, the GEM listens to the metrics broadcast by the sites. If within a pre-specified time, site N reports performance data y with accuracy z a pre-specified number of times, then the GEM increases the expert score for site N for metric y by a certain amount. (If site N is not currently listed in the Global Expert Index, then it is added with a default expert score.) Conversely, if for a certain amount of time, site N broadcasts no further updates to performance data y, then the GEM may decrease its expert score.

For Reputation, the GEM applies one of the methods available in the current art for Social Content Management, e.g., calculating a recommendation score based on the number of times peers have queried site N for performance data y.

For Efficiency, the GEM periodically reviews its Global Expert Index and checks the number of sites that are currently experts for performance data y. If the number exceeds a certain threshold, then one site, e.g., the one with the lowest availability and reputation score, is identified, and the expert score for this site in the Global Expert Index is set to zero, indicating that the site is no longer considered an expert. The GEM utilizes a stochastic search algorithm, e.g., Genetic Algorithm, to select the best thresholds for such "expert pruning" while maintaining a sufficient certainty that there is at least one site that can respond to a query for performance data y, thereby dynamically answering the question, "How many experts are enough?"

Using low-priority bandwidth, the GEM can periodically broadcast its Global Expert Index to the sites that it manages. As applicable, the expert scores in the Global Expert Index are updated, when the GEM is notified by a site stating that it considers itself to be an expert for particular performance data. The GEM weighs this "volunteer" request by the availability and reputation metrics that may exist for site N. Based on the type of queries, e.g., from the network operator, the GEM adapts the Global Expert Index, correspondingly identifying/enabling more/fewer sites to be experts in the areas of greater/lesser interest.

A next step 204 includes archiving a portion of the performance data into a memory of the LEM in response to the rating of the performance data. Performance data with high interest or importance ratings are retained while other less interesting or important performance data is discarded, thereby saving resources. The retained data enables that LEM to be considered an expert for the data. For example, based on pre-defined interestingness rating thresholds (T1 through T3), the LEM can take the following action: if $IS(x)<T1$, then discard performance data; if $T1<=IS(x)<T2$, then update any other metrics derived from the performance data, and discard the performance data; if $T2<=IS(x)<T3$, then retain the performance data in memory; and if $T3<=IS(x)$, then broadcast to neighbor sites that the LEM of site M considers itself to be an expert for this performance data x. The raw data items x, or the metrics y that are calculated from the raw data x, can be managed according to the same thresholds or different thresholds.

Periodically, the LEM of site M can modify the interestingness rating thresholds for performance data x in its local database. The thresholds T can be empirically and dynamically determined or changed based on available resources such as communication bandwidth or capacity (for broadcasting), storage capacity (for data retention), and processor capacity. In particular, the LEM monitors its local resources, e.g., processor power, processor availability, and storage, to characterize the cost of collecting data items and metrics. It periodically updates its thresholds to reflect the relative tradeoffs for things for which other sites (may) consider site M to be an expert, but are costly to sustain such expertise; things for which other sites (may) consider site M to be an expert, but other (potentially unrecognized) experts exist, etc. In this way, the interestingness rating thresholds are modified to change the manner in which performance data are archived.

A next step 206 includes modifying an operation of the communication network based on the archived performance data to optimize network operation, performance and topology.

In an optional embodiment in the generating step 202, the GEM can periodically provide to a site's LEM a recommended set of coefficients for its IS(x) function to coordinate multi-site collaboration. For example, if the GEM detects an unexpectedly large amount of peer-to-peer queries, or X2 bandwidth has become highly utilized, then it may recommend de-prioritizing R(x), i.e., the component of IS(x) that reflects peer-rating of sites as experts. In another example, if a certain type of alarm/warning has been raised (e.g., characterizing dropped calls or increased error rate), then the GEM may recommend increasing the priority of S(x), i.e., the component of IS(x) that reflects the importance given to statistically different data, i.e., "outliers" which may hold key insights for diagnosing the root cause of the alarm/warning. In another example, if a new site has been added to the network, the GEM may recommend increasing the priority of Q(x), i.e., the component of IS(x) that reflects the importance given to the expert quality scores from GEM, thereby increasing the likelihood that things proceed according to a centrally established deployment plan.

Advantageously, the present invention provides a multi-agent system with up to a three-way collaborative learning model, i.e., nodes evaluating themselves, nodes evaluating peers, and nodes being advised by a global entity or GEM (with guidance for how nodes calculate score and subsequently use scores). Some novels aspects of the present invention are (a) the coordinated process of collecting data, and (b) the calculation method for the Interestingness Score. Although the present invention can operate in a pure peer-to-peer manner, wherein after the network has been deployed and configured, the Local Expert Managers at multiple sites may operate on a peer-to-peer basis, i.e., without a Global Expert Manager, it is further envisioned that the present invention would benefit with the addition of a Global Expert Manager.

One benefit of the GEM is an improved resource utilization, wherein the GEM knows all nodes that are collecting data in a specific knowledge area, and thus are candidate "experts". Each source of expertise is rated in terms of its reputation (quality), availability (response time), and efficiency (resource utilization). On a periodic basis the GEM performs a Service-Level Optimization, e.g., using a standard queuing model from Inventory Management, to select the most efficient set of experts that can provide responses to anticipated queries, subject to maintaining a minimum acceptable confidence level, e.g., 99.99%, and response time, e.g., 500 ms. Thanks to the global optimization done by the GEM, the nodes may confidently discard data they had been storing locally, without jeopardizing the network's overall knowledge base. Likewise, the nodes may reduce their computational load by disabling data gathering, parsing, and analysis operations, when the GEM informs them that their "expertise" is not needed in a given knowledge area.

Another benefit of the GEM is a faster access time, wherein the GEM maintains statistics on the responsiveness of nodes with specific expertise. Thus, when a node requests data, the GEM can refer it to a node that not only has the relevant "expert" data but also is most likely to respond to the request within an acceptable timeframe. The GEM is able to monitor global trends in the response times of queries for data, and is aware of new expertise developed by a node (but not yet queried by other nodes).

Another benefit of the GEM is an increased visibility, wherein the GEM maintains a Global Expert Index; and therefore, it is possible for any node in the network to find any other node with just one query. The Global Expert Index is updated based on peer ratings and global considerations (as addressed in the bullets above). In this way the GEM provides an approach to efficiently and dynamically designate specific nodes as "experts". It is by designating nodes as "experts" that system-wide performance and resource efficiency gains can be achieved.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for information storage and retrieval of communication network performance data, the method comprising the steps of:
   obtaining performance data from network entities;
   generating a rating for the performance data relating to how interesting that data is to network entities; and
   archiving a portion of the performance data in response to the rating of the performance data;
   wherein the generating step includes rating the performance data in terms of a combination of a global rating, a peer rating, and a uniqueness rating of the performance data; and
   wherein a score for particular performance data is an interestingness score function:

$$IS(x)=f(c_1Q(x),c_2R(x),c_3S(x))$$

where x is the performance data to be scored, $c_i$ are relative importance coefficients, Q is the global rating, R is the peer rating, and S is the uniqueness rating.

2. The method of claim 1 wherein the obtaining step includes monitoring network resource utilization, and the generating step includes communicating an updated set of coefficients for calculating an interestingness score.

3. The method of claim 1 further comprising the step of modifying an operation of the communication network based on the archived performance data.

4. The method of claim 1 wherein the obtaining step includes querying a network entity for performance data in which the network entity considers itself an expert.

5. The method of claim 1 wherein the archiving step includes deleting performance data that does not meet a first interestingness rating threshold.

6. The method of claim 5 wherein, if the interestingness rating of the performance data falls between the first and a second interestingness rating threshold, then a performance metric is updated using the performance data, and the performance data is then deleted.

7. The method of claim 6 wherein, if the interestingness rating of the performance data falls between the second and a third interestingness rating threshold, then the performance data is retained, and if the interestingness rating of the performance data falls between the third and a fourth interestingness rating threshold, then the performance data is broadcast to at least one other network entity.

8. The method of claim 1 wherein the archiving step includes modifying interestingness rating thresholds in response to available resources such that the archiving step changes the manner in which performance data are archived.

9. The method of claim 1 further comprising the step of providing an expert index that identifies network entities having an expert score for particular performance data.

10. The method of claim 9 wherein the expert score is derived for a network entity by a number of times a performance data is provided by that network entity and an accuracy of the performance data provided by that network entity.

11. The method of claim 9 wherein the expert score is derived for a network entity by a number of times that the network entity is queried for the performance data.

12. The method of claim 9 wherein if multiple network entities are indexed as experts for the same performance data, then the network entity with the lowest expert score for that performance data is delisted as an expert for that performance data.

13. The method of claim 9 wherein network entities can recommend themselves for a global expert index as experts for particular performance data, and are accepted into the global expert index depending on their expert scores.

14. An apparatus for information storage and retrieval of communication network performance data, the apparatus comprising:
   a local expert manager comprising:
      a receiver operable to obtain performance data from network entities;
      a processor coupled to the receiver and operable to generate a rating for the performance data relating to how interesting that data is to network entities; and
      a memory coupled to the processor and operable to archive a portion of the performance data in response to the rating of the performance data;
   a global expert manager that maintains a global expert index that identifies local expert managers having an expert score for particular performance data; and
   wherein the score is an interestingness score function:

$$IS(x)=f(c1Q(X), c2R(x), c3S(x))$$

where x is the performance data to be scored, ci are relative importance coefficients, Q is a global rating of the performance data, R is a peer rating of the performance data, and S is a uniqueness rating of the performance data.

15. The apparatus of claim 14 wherein the local expert manager is operative within a Base Transceiver Station of a cellular telecommunication network.

16. The apparatus of claim 14 wherein the local expert manager monitors the utilization of a resource with which to communicate with a second local expert manager and dynamically adjusts the policy for when data should be communicated.

* * * * *